United States Patent
Hause et al.

(10) Patent No.: US 11,465,616 B2
(45) Date of Patent: Oct. 11, 2022

(54) CROSS TRAFFIC ALERT WITH FLASHING INDICATOR RECOGNITION

(71) Applicant: Ford Global Technologies, LLC, Dearborn, MI (US)

(72) Inventors: Ronny Hause, Cologne (DE); Franziskus Bauer, Huerth (DE); Dragosch Konstantin, Cologne (DE); Christian Marquardt, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 508 days.

(21) Appl. No.: 16/242,251

(22) Filed: Jan. 8, 2019

(65) Prior Publication Data
US 2019/0225211 A1    Jul. 25, 2019

(30) Foreign Application Priority Data
Jan. 22, 2018  (DE) .......................... 102018200944.9

(51) Int. Cl.
*B60W 30/09*   (2012.01)
*B60W 30/095*  (2012.01)
(Continued)

(52) U.S. Cl.
CPC ............ *B60W 30/09* (2013.01); *B60W 10/18* (2013.01); *B60W 30/0953* (2013.01);
(Continued)

(58) Field of Classification Search
CPC .. B60W 30/09; B60W 10/18; B60W 30/0953; B60W 30/0956;
(Continued)

(56) References Cited

U.S. PATENT DOCUMENTS 8,207,835 B2   6/2012  Schwartz et al.
8,903,638 B2  12/2014  Lin et al.
(Continued)

FOREIGN PATENT DOCUMENTS

KR   1020160045483 A     4/2016
KR     20170071272 A  *  6/2017

OTHER PUBLICATIONS

Machine Translation of Kim, KR-20170071272-A, Espacenet. (Year: 2017).*

(Continued)

*Primary Examiner* — Mahmoud S Ismail
*Assistant Examiner* — Gabriel Anfinrud
(74) *Attorney, Agent, or Firm* — Frank Lollo; Bejin Bieneman PLC

(57) ABSTRACT

A rearwardly directed movement of a first vehicle that has a driving assistance system that can be controlled, the driving assistance system having at least one sensor and a control device, in which threshold values for triggering a warning intervention and/or braking intervention in respect of the interval in relation to at least one further road user are set, and additionally being connected to or having a camera, by which activated travel-direction indicators of a further road user are recognized, which travel-direction indicators are included in the calculation of a probable trajectory of the further road user, and a probability of a collision is calculated, according to which the threshold values are lowered or raised.

20 Claims, 5 Drawing Sheets

(51) Int. Cl.
- *B60W 30/18* (2012.01)
- *B60W 10/18* (2012.01)
- *B60W 50/14* (2020.01)
- *G06V 20/58* (2022.01)
- *G06V 20/56* (2022.01)

(52) U.S. Cl.
CPC .. *B60W 30/0956* (2013.01); *B60W 30/18036* (2013.01); *B60W 50/14* (2013.01); *G06V 20/584* (2022.01); *G06V 20/588* (2022.01); *B60W 2050/143* (2013.01); *B60W 2420/42* (2013.01)

(58) Field of Classification Search
CPC .......... B60W 30/18036; B60W 50/14; B60W 2050/143; B60W 2420/42; G06K 9/00798; G06K 9/00825
See application file for complete search history.

(56) References Cited

U.S. PATENT DOCUMENTS

| | | |
|---|---|---|
| 9,061,635 B2 | 6/2015 | Luo et al. |
| 9,248,834 B1* | 2/2016 | Ferguson .......... B60W 30/0956 |
| 2010/0204866 A1* | 8/2010 | Moshchuk ......... B62D 15/0285 701/25 |
| 2017/0088053 A1 | 3/2017 | Orellana et al. |
| 2017/0113683 A1* | 4/2017 | Mudalige ........ B60W 30/18145 |
| 2017/0174261 A1* | 6/2017 | Micks ...................... B62D 6/00 |
| 2019/0019412 A1* | 1/2019 | Roca ..................... G01S 13/931 |
| 2019/0122037 A1* | 4/2019 | Russell ............. B60W 30/0956 |
| 2019/0362632 A1* | 11/2019 | Fokin ................ B60W 30/0953 |

OTHER PUBLICATIONS

"Blind Spot Information System with Cross Traffic Alert", https://owner.ford.com/how-tos/vehicle-features/safety/blind-spot-information-system-with-cross-traffic-alert.html, May 29, 2017.

Howard, "Blind spot detection: Car tech that watches where you cant", https://www.extremetech.com/author/bhoward, Sep. 5, 2013.

* cited by examiner

CROSS TRAFFIC ALERT WITH FLASHING INDICATOR RECOGNITION

CROSS-REFERENCE TO RELATED APPLICATION

This patent application claims priority to German Application No. DE 102018200944.9 filed on Jan. 22, 2018, which is hereby incorporated by reference in its entirety.

BACKGROUND

Modern motor vehicles are frequently equipped with a so-called cross-traffic alert system (CTA), which can warn of other road users approaching rearward of the vehicle. In addition to or in combination with the CTA, braking intervention systems are also provided, which trigger a braking operation if another road user is present within a predefined and speed-dependent distance from the vehicle. Current CTAs use primarily radar data in order to recognize approaching road users and to estimate their probable further course, and thus a possible collision point. In some instances, in the case of road users that are not approaching on a straight path, it is not possible to map accurately how far they come into the rearward travel region of the vehicle. Besides radar data, a back-up may also be used to improve the coverage of the rearward region of the vehicle.

However, if approaching road users do not represent a hazard, because they wish to steer a course other than the assumed collision course, the braking systems may trigger an unnecessary braking operation. Also negatively affected, in a similar manner, is the proportion of false alarms of the warning systems that emit an acoustic and/or visual signal. There therefore exists a need to improve existing CTAs.

SUMMARY

The present disclosure relates to controlling a rearwardly directed movement of a motor vehicle that has a driving assistance system, taking account of the travel-direction indication of an approaching road user.

This subject matter is achieved by a method having the features of claim 1. Further advantageous embodiments and designs are given by the figures, the exemplary embodiments and the coordinate and dependent claims. The embodiments or designs, each individually or in various combination of at least two of these designs with each other, may represent an enhancing, in particular also preferred or advantageous, aspect of the present subject matter.

A first aspect relates to a method for controlling a rearwardly directed movement of a first vehicle that has a driving assistance system, the driving assistance system having at least one sensor and a control device, and having at least one camera or being connected to a camera, and, in the case of the driving assistance system, threshold values being set for triggering a warning intervention and/or braking intervention in respect of the spatial and/or time interval in relation to at least one further road user. The method is characterized by the steps:
operating the first vehicle,
engaging the reverse gear,
calculating a first trajectory, relating to a planned rearward movement of the first vehicle,
ascertaining data in respect of at least one potential road user approaching from the rear or the side,
ascertaining data in respect of a travel-direction indicator of the approaching road user,
estimating a second trajectory, relating to a movement of the approaching road user,
by means of the control device, adapting the threshold values for a warning intervention and/or braking intervention.

The method is advantageous because the detection of the travel-direction indication renders possible improved recognition of valid and non-valid transversely travelling objects. The probability of false alarms, and consequently unnecessary warnings and braking operations, is reduced. The method is thus economical of time and energy. The method is suitable for any rearward travel (e.g. for simple reversing, in parking, turning and/or backing out). The operating of the first vehicle also puts the driving assistance system into operation.

The first vehicle is, in particular, a motor vehicle. The method is also suitable for other vehicles, insofar as they have a driving assistance system. Other road users are understood to mean, in particular, further motor vehicles. However, this term also includes bicycles, carts or pedestrians.

The first trajectory, which corresponds to the calculated further travel path of the first vehicle, is also referred to hereinafter as the planned trajectory. The second trajectory, which corresponds to the estimated further travel path of the approaching road user, is also referred to hereinafter as the estimated trajectory.

Travel-direction indicators are understood to mean, in particular, flashing indicators of motor vehicles. However, this term also includes hand signals, or travel-direction indications conveyed by signaling disks.

Sensors are understood to means sensors that can detect an approaching road user, and the movement thereof. More precisely, sensors may also include the camera. Owing to the importance for the detection of the travel-direction indicators, the camera is mentioned separately here.

The said threshold values in respect of the spatial interval relate to the distance between the first vehicle and the approaching road user, the attainment/undershooting of a specific distance being considered as critical and resulting in the triggering of a warning and/or a braking intervention. This applies analogously to the time interval, the time interval relating to the time until a possible collision.

The driving assistance system preferably comprises a cross-traffic alert (CTA).

Preferably, in the method according to the invention, the threshold value for a warning intervention and/or braking intervention of the first vehicle is lowered in the case of a travel-direction indication of the approaching road user in the direction of the first trajectory. In other words, if the travel-direction indication points in the direction of the planned trajectory that the first vehicle intends to take, the threshold value is reduced, i.e. the warning signal or braking intervention is triggered earlier than if no planned change in travel direction were triggered by the approaching road user. If no change in the travel direction is indicated by the approaching road user, the threshold values remain unchanged.

Likewise preferably, the threshold value for a warning intervention and/or braking intervention of the first vehicle is increased in the case of a travel-direction indication of the approaching road user in a direction other than toward the first trajectory. In other words, if the travel-direction indication points away from the planned trajectory that the first vehicle intends to take, the threshold value is increased, i.e. the warning signal or braking intervention is triggered later than if no planned change in travel direction were triggered by the approaching road user. Unnecessary warnings and braking interventions, which are inconvenient, and also time-consuming and energy-consuming, are thereby advantageously avoided. It is also possible for the triggering of a warning signal or braking intervention to be suppressed entirely.

It is furthermore preferred if the first vehicle can additionally enter into an automated communication link with the approaching road user. The so-called V2V (vehicle-to-vehicle) communication in this case is included in the detection of the travel-direction indicator of the approaching road user, such that the probability of the approaching road user taking a specific direction is increased. Advantageously in this case, when an estimated trajectory of the approaching road user has been determined, it can more easily be decided whether a warning or a braking intervention of the first vehicle is to be effected.

Preferably, traffic-lane information, provided on the basis of map data, navigation devices, satellites and/or by Cloud support, is additionally included in the determining of the estimated trajectory. These data may represent the current traffic situation, or be of a statistical nature, relating to the traffic flow in a specific road section. Advantageously in this case, when an estimated trajectory of the approaching road user has been determined, it can more easily be decided whether a warning or a braking intervention of the first vehicle is to be effected. Particularly preferably, the traffic-lane information includes usage restrictions for traffic lanes that may be possible trajectories of the approaching road user. Thus, if a traffic lane is blocked, interrupted by a construction side or is authorized only for one direction of travel, this is advantageously also included in the calculation of the probability of the approaching road user taking a specific direction.

Preferably, the first trajectory for a parking-space exit operation by the first vehicle is calculated. Advantageously in this case, during the exiting from a parking space, an approaching road user and the travel-direction indicator thereof are detected, in order to bring to an end the parking-space exit operation, without excessive braking and/or warning, if the travel-direction indicator of the approaching road user is not pointing in the direction of the planned trajectory, or to stop and warn in good time if the travel-direction indicator of the approaching road user is pointing in the direction of the planned trajectory.

Likewise preferably, the first trajectory for a parking-space entry operation by the first vehicle is calculated. Advantageously in this case, during the entry into a parking space, an approaching road user and the travel-direction indicator thereof are detected, in order to bring to an end the parking-space entry operation, at least until a critical value is attained, without excessive braking and/or warning, if the travel-direction indicator of the approaching road user is not pointing in the direction of the planned trajectory, or to stop and warn in good time if the travel-direction indicator of the approaching road user is pointing in the direction of the planned trajectory.

A second aspect of the invention relates to a motor vehicle that has a driving assistance system, having at least one sensor and a control device for determining approaching road users, for calculating trajectories and controlling warning and/or braking interventions, the control device being designed to calculate a first trajectory for a planned rearward maneuver of the motor vehicle, and to issue to devices of the motor vehicle corresponding control commands to start a maneuver according to the first trajectory, to recognize, according to values transmitted by the sensor, at least one approaching road user and, by means of data in respect of a travel-direction indication of the approaching road user, to estimate a second trajectory relating to the approaching road user, and to adapt threshold values for a warning intervention and/or braking intervention in dependence on the ascertained second trajectory and the travel-direction indication of the approaching road user.

The advantages of the disclosed motor vehicle correspond to the advantages of the disclosed method.

SUMMARY OF THE DRAWINGS

Greater detail is provided on the basis of the figures, which show.

DESCRIPTION

Figure 1:
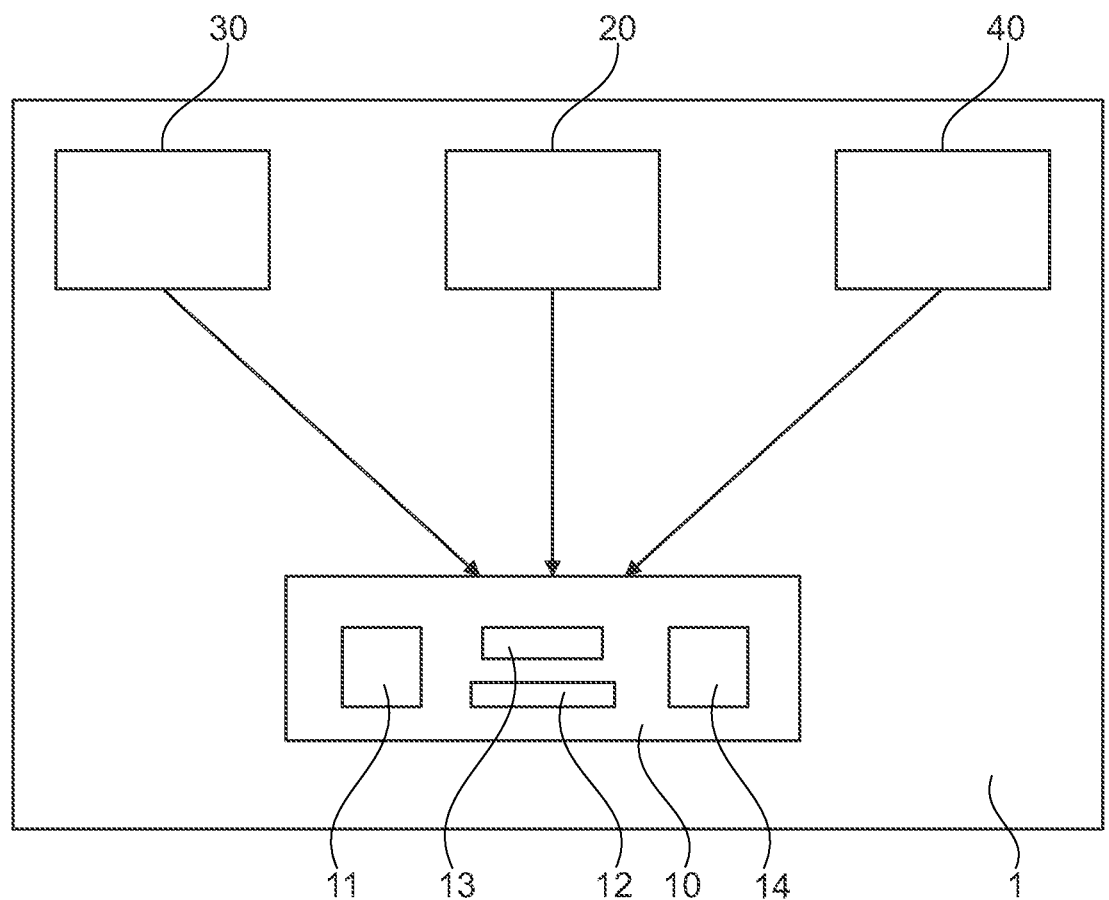
FIG. 1: a block diagram of an embodiment of an example motor vehicle.

Represented in modular form in FIG. 1 are the components of an example motor vehicle 1 (first vehicle) that are necessary for execution of the present method. The motor vehicle according to FIG. 1 is also referred to as the first vehicle. The modules in this case do not necessarily correspond to spatial units, but may be regarded as functional units that function within a control device, which is accordingly designed to control the method. The modules in this case may also include each other, i.e. individual modules may be sub-modules of a particular module.

A first module 10 corresponds to a CTA. The CTA is comprised in a fully automated parking assistance system. The first module 10 comprises sensors 11 designed to detect obstacles, in particular other road users, in a relatively close rearward environment of the first vehicle 1. The sensors are, for example, ultrasonic sensors, or are based on radar, laser, lidar or other technologies. The first module 10 furthermore comprises a warning device and a braking system 12, or is connected to corresponding devices of the first vehicle 1.

The first module 10 furthermore comprises a control device 13. The control device 13 is an electronic control unit having the algorithms of the CTA function. The control device is designed to receive signals from the sensors, to estimate distance, speed and probable trajectory of other approaching road users, and to issue control commands to the warning device and/or braking system. The warning device in this case may generate signals of an acoustic (sounds via loudspeaker), visual (e.g. via light-emitting diodes or display screen) or, also, tactile nature (vibrations).

A second module 20 comprises a camera, which is directed onto the rearward space of the first vehicle 1. The camera in this case is preferably designed such that it can cover the environment in an angle of 180° of the rearward space. The camera may also be movable and, during a maneuver, be swiveled, in particular, in the direction in which the first vehicle is moving. The second module 20 in this case is provided, in particular, to detect the travel-direction indicators 14 of other road users. The second module 20 is designed to send acquired data to the first module 10, and thus also to the control device 13. Alternatively, the first module 10 may also have a camera, which therefore may be comprised by the sensors 11.

A third module 30 comprises a navigation system. The navigation system is designed to provide, for example, road map information, traffic lane information and usage restrictions for traffic lanes that are affected by the estimated trajectory. The third module 30 is designed to send acquired data to the first module 10.

A fourth module 40 comprises a communication device. In particular, the fourth module 40 comprises at least one device designed for vehicle-to-vehicle communication. The fourth module 40 is designed to send received information, in particular in respect of an estimated trajectory of at least one approaching road user, to the first module 10.

Figure 2:
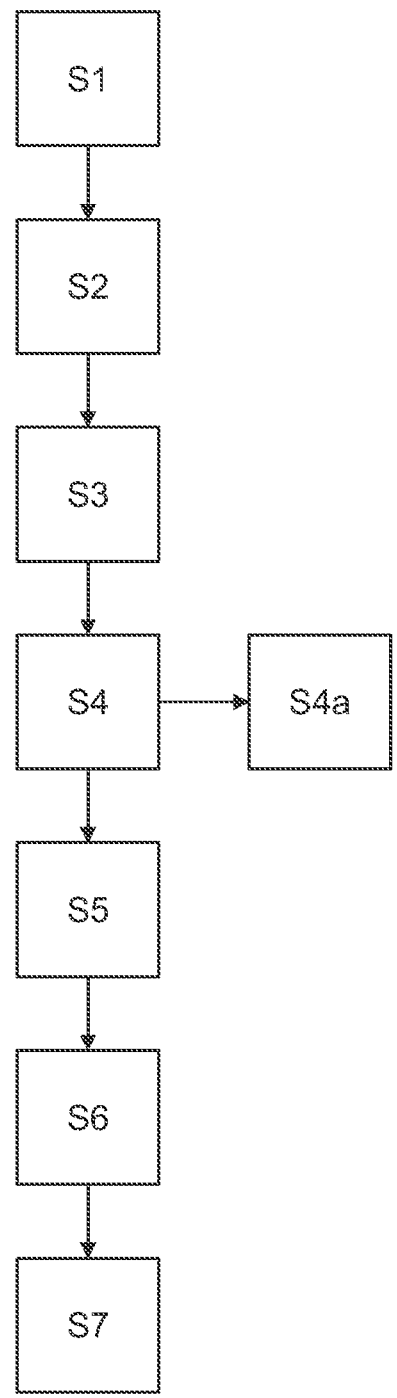
FIG. 2: a flow diagram of an embodiment of an example method.

In the example of the method shown in FIG. 2, the first vehicle 1 is put into operation in a first step S1. In this case, the necessary operating systems of the vehicle are started, such that movement can start. In a second step S2, the reverse gear is engaged, such that it is obvious that the planned movement of the first vehicle 1 in the rearward direction is started. The CTA is also put into operation in step S2.

In a third step S3, a first trajectory is calculated. This first trajectory relates to a planned rearward movement of the first vehicle 1. Included in the calculation are a planned direction of travel (indicated, for example, by a set travel-direction indicator 14, steering angle, yaw rate and/or further parameters) and detected clear areas (e.g. parking spaces between other vehicles, clear carriageway). For example, in the case of a right setting of a flashing indicator and a parking space detected in a rearwardly directed travel direction of the first vehicle 1, a planned trajectory directed into this parking space is calculated.

In a fourth step S4, data in respect of at least one potential road user approaching from the rear or the side are ascertained by the sensors 11. In this case, it is primarily ascertained whether a road user is approaching. If no road user is ascertained (N for No), the first trajectory is continued without warning signals or braking interventions and brought to an end (S4a). If a road user is ascertained (Y for Yes), the method proceeds to a fifth step S5, in which data in respect of a travel-direction indicator 14 of the approaching road user are ascertained. In the case of another motor vehicle, the travel-direction indicator 14 is a flashing indicator 14. In the case of cyclists, hand signals are also classified as a travel-direction indication 14, or also, for example, hand signaling disks in the case of carts. In this case, the camera of the second module 20 detects whether approaching road users have or have not set, for example, a flashing indicator 14, and what change of direction is indicated by the flashing indicator 14.

In a sixth step S6, a second trajectory, relating to a movement of the approaching road user, is estimated by the control device 13 on the basis of the ascertained data of the approaching road user. Included in this case is whether a flashing indicator has been set, and if so, whether it points in the direction of the first trajectory or in the other direction, away from the first trajectory. The flashing indicator setting in this case is included in the estimating of the second trajectory.

In a seventh step S7, threshold values for a warning intervention and/or braking intervention, which at the beginning of the method have a predefined, standardized value, are adapted by the control device. The threshold values are predefined, and relate in particular to detected road users that, upon further approach, may potentially come into the region of the first trajectory. If it is apparent from the calculations that there is a high probability that the second trajectory will touch the first trajectory, the predefined threshold values are lowered. This is the case, for example, if the travel-direction indicators 14 of the approaching road user point in the direction of the first trajectory of the first vehicle. Then, in the case of a predefined interval being undershot by the approaching road user, a corresponding control command is issued by the control device 13 to the warning device and/or braking system, and accordingly a warning signal is activated and/or a braking intervention is triggered. If the travel direction indicators 14 of the approaching road user are not activated, the predefined threshold values are maintained.

If it is apparent that there is a high probability that the second (estimated) trajectory and the first (planned) trajectory will not touch, the threshold values for triggering a warning signal and braking intervention are increased. In other words, warning signals are activated and/or a braking intervention is triggered only in the case of higher values in comparison with the threshold values predefined at the start of the method. This relates, in particular, to a lesser interval from the first vehicle 1 to the approaching road user, from which a warning and/or braking intervention is triggered.

Described in FIGS. 3-6, for the purpose of illustrating the method, is the reaction of the driving assistance system of the first vehicle 1 to the actions of a target vehicle 2, which is the further, approaching road user (in the sense of a target that is detected by the driving assistance system of the first vehicle). It is clear from the context of this description that the approaching road user may also be bicycle riders, pedestrians and/or carts.

Figure 3:
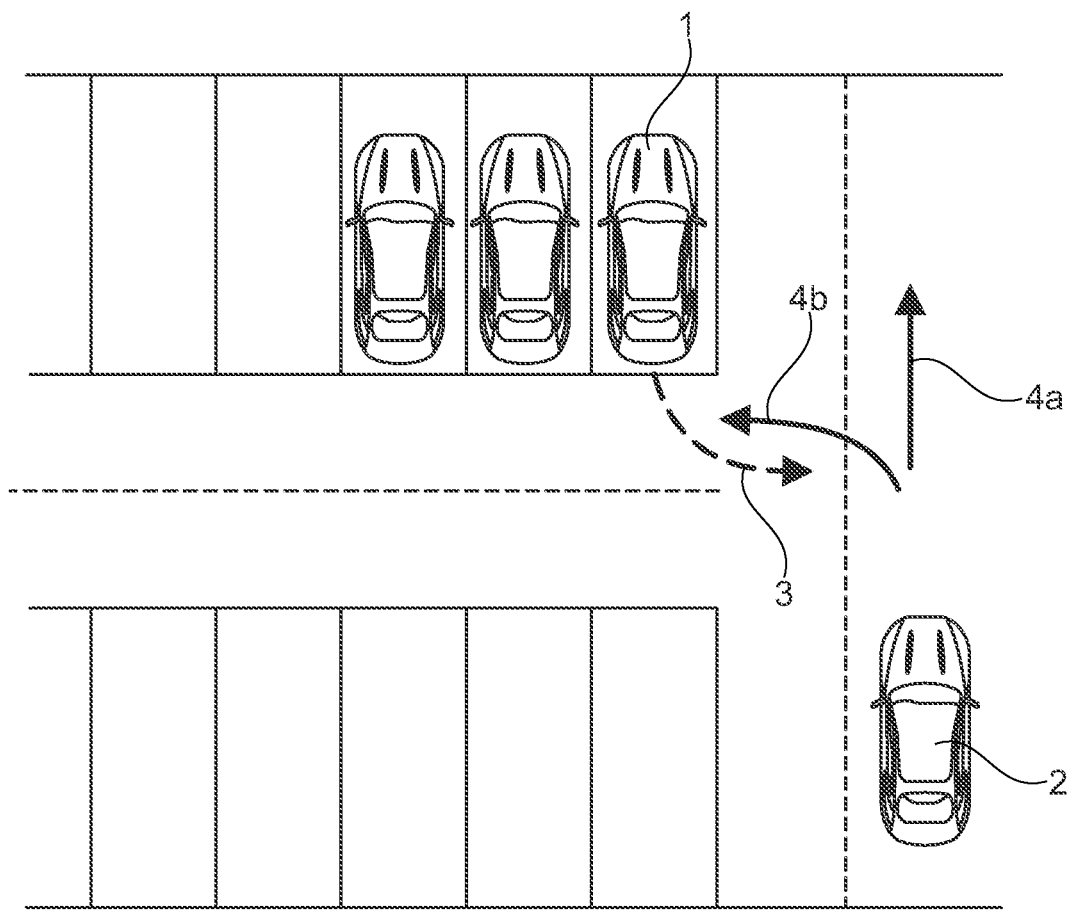
FIG. 3: a schematic representation of a parking-space maneuver scenario.

The core of the method is explained in FIG. 3 on the basis of a parking-space situation. The light-colored vehicle in the parking space on the right is the first vehicle 1. The first vehicle 1 is about to move rearward out of the parking space, according to a planned trajectory 3. The vehicle approaching from bottom right is the target vehicle 2, the possible further movement of which is indicated by the two arrows. The arrow pointing straight ahead from the target vehicle 2 indicates a straight-ahead movement, having an estimated trajectory 4a, the arrow pointing to the left indicating a left turn, having an estimated trajectory 4b. By means of the method, it is detected whether the target vehicle 2 is or is not indicating a turn. If it does not indicate a turn, the driving assistant assumes that it will drive straight ahead, and the threshold value for the triggering of a braking intervention is increased. In this case, no warning signal and/or braking intervention is triggered. Should the second vehicle turn left, despite not indicating, the braking intervention would be triggered upon attainment of the increased threshold value, which corresponds to a lesser interval than the normal threshold value. If the second vehicle 2 does indicate a turn, however, this is detected by means of the method according to the invention, and a warning signal and/or braking intervention are triggered. Instead of, or in addition to, the flashing indicator signal or a plurality of flashing indicator signals, information of the modules 30 and 40 may also be used for calculating the appropriate threshold value.

Figure 4:
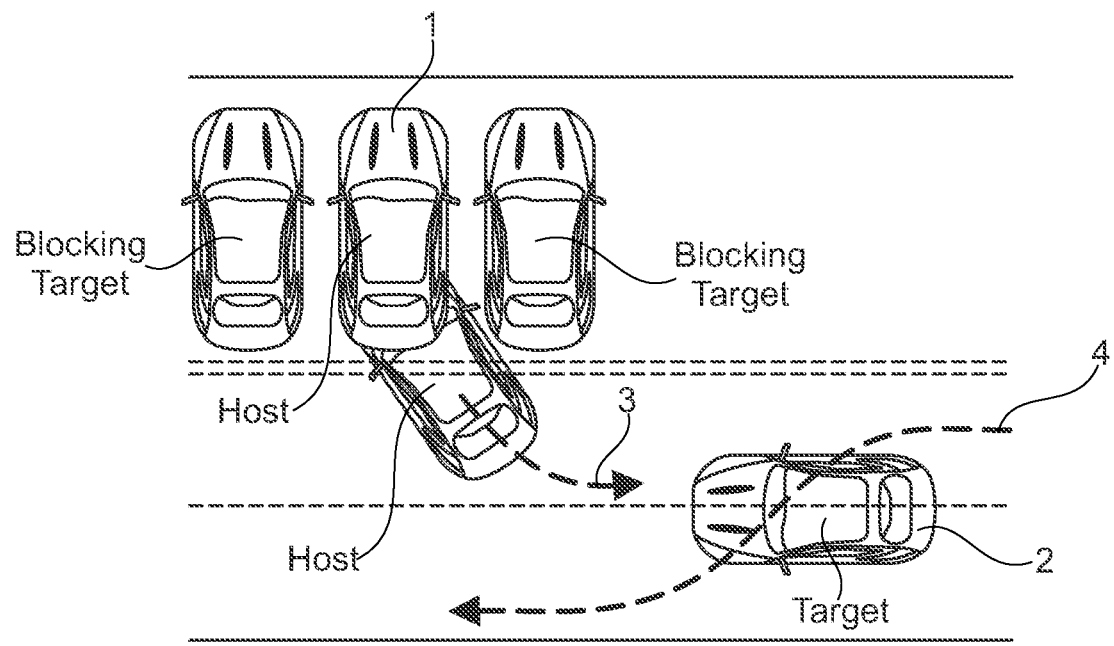
FIG. 4: a schematic representation of a parking-space maneuver scenario for exit from a parking space by the motor vehicle according to FIG. 1.

In the situation represented in FIG. 4, the first vehicle 1 is about to exit from a parking space between two other vehicles, along a first trajectory 3, onto a carriageway. Approaching from the right is a second vehicle 2, which has activated the left flashing indicator. The driving assistant of the first vehicle 1 detects the second vehicle 2 in step S4, and in step S5 the activated left flashing indicator of the second vehicle. A second trajectory 4, which does not come into contact with the first trajectory 3, is estimated in step S6 for the movement of the second vehicle 2. It can thus be decided in step S7 that the probability of a collision is reduced, and to increase the threshold values for warning signal and/or braking intervention. This is effected in order not to trigger a warning signal and/or a braking intervention, as long as the second vehicle does not undershoot an interval that corresponds to the increased threshold value. Terms such as "reduced" or "increased" in respect of probability and threshold values relate to the comparison with normal values, which do not include the travel-direction indicator 14 and/or other information provided by the modules 30 and 40.

Figure 5:
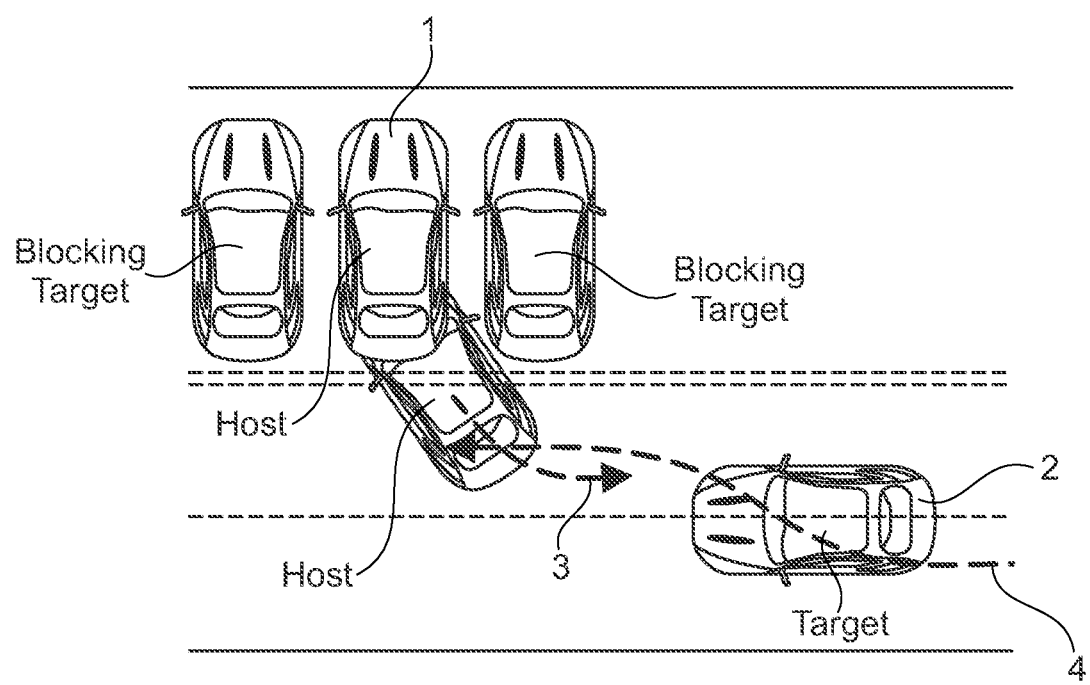
FIG. 5: a schematic representation of a further parking-space maneuver scenario for exit from a parking space by the motor vehicle.

In FIG. 5 the situation is similar to that of FIG. 4. Here, the second vehicle 2 approaching from the right has activated the right flashing indicator. The driving assistant of the first vehicle 1 detects the second vehicle in step S4, and in step S5 the activated right flashing indicator of the second vehicle 2. In step S6, a second trajectory 4, which comes into contact with the first trajectory 3, is calculated for the movement of the second vehicle 2. It can thus be decided in step S7, on the basis of an increased probability of a collision, not to alter, or alternatively to lower, the threshold values for warning signal and/or braking intervention, such that a warning signal and/or braking intervention is triggered in good time.

Figure 6:
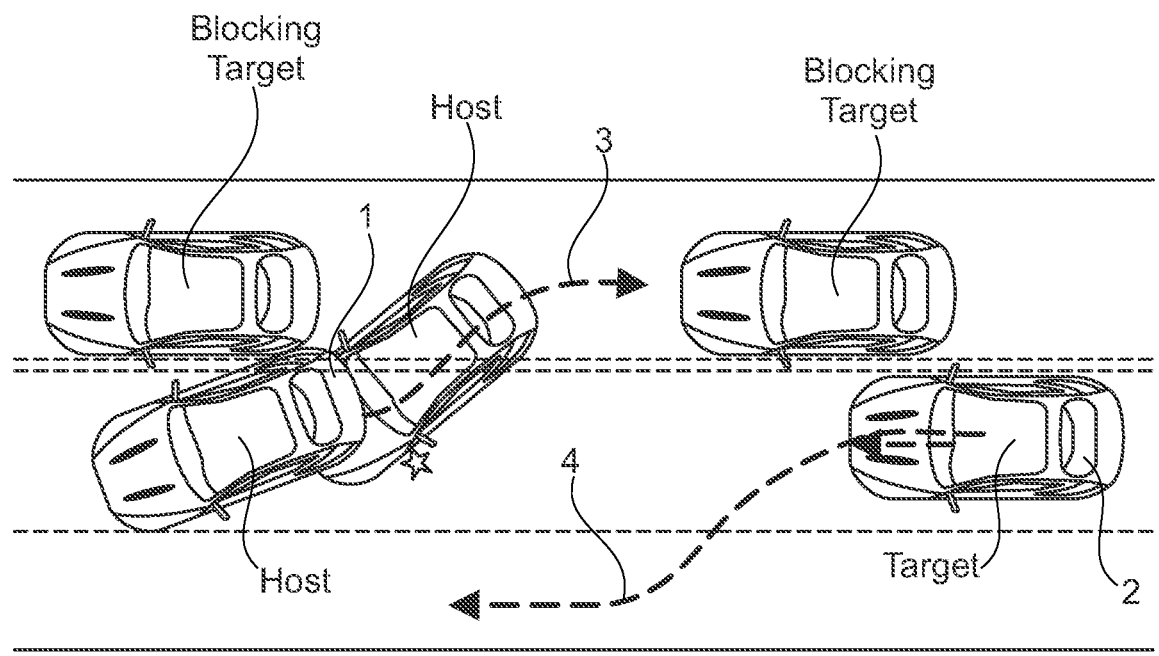
FIG. 6: a schematic representation of a parking-space maneuver scenario for entry into a parking space by the motor vehicle.

In the situation represented in FIG. 6, the first vehicle 1 is about to enter a parking space rearwards between two other vehicles, along a first trajectory 3 (in a so-called parallel parking maneuver). Approaching from the right is a second vehicle 2, which has activated the left flashing indicator. The driving assistant of the first vehicle 1 detects the second vehicle 2 in step S4 and the activated left flashing indicator of the second vehicle in step S5. In step S6, a second trajectory 4, which does not come into contact with the first trajectory 3, is calculated for the movement of the second vehicle 2. It can thus be decided in step S7, on the basis of a lesser probability of a collision, to increase the threshold values for warning signal and/or braking intervention, and not to trigger a warning signal and/or braking intervention, as long as the second vehicle does not undershoot an interval that corresponds to the increased threshold value.

If no flashing indicator of the second vehicle 2 were set, the method would proceed in such a manner that the driving assistant of the first vehicle 1 detects the second vehicle 2 in step S4, but in step S5 does not detect an activated flashing indicator of the second vehicle 2. In step S6, a second trajectory 4 is calculated for the movement of the second vehicle 2, to the effect that it extends straight ahead from the second vehicle and comes into contact with the first trajectory 3. It is thus decided in step S7 not to alter the threshold values for warning signal and/or braking intervention, such that a warning signal and/or braking intervention can be triggered in good time.

LIST OF REFERENCES

1 first vehicle
2 target vehicle
3 first, planned trajectory
4 second, estimated trajectory
4*a* straight-ahead estimated trajectory
4*b* turning-off estimated trajectory
10 first module
11 sensor
12 human-machine interface
13 control device
14 travel-direction indicator of the target vehicle
20 second module
30 third module
40 fourth module

The invention claimed is:

1. A method for controlling a rearwardly directed movement of a first vehicle having a driving assistance system that includes a control device, the method comprising:
   operating the first vehicle;
   engaging a reverse gear in the first vehicle;
   calculating a first trajectory of a planned rearward movement of the first vehicle;
   obtaining data about a second vehicle approaching from the rear or the side;
   obtaining data specifying a travel-direction indicator of the second vehicle;
   estimating a second trajectory of the second vehicle based on detecting one of an absence or a presence of the travel-direction indicator of the second vehicle;
   in the control device, adapting threshold values for one or both of a warning intervention and a braking intervention based on detecting a presence of the travel-direction indicator of the second vehicle, wherein the threshold values are set in the driving assistance system to trigger the warning or braking intervention based on a spatial interval or a time interval in relation to the second vehicle; and
   maintaining the threshold values for one or both of the warning intervention and the braking intervention based on detecting an absence of the travel-direction indicator of the second vehicle.

2. The method of claim 1, the driving assistance system comprising a cross-traffic alert.

3. The method of claim 1, wherein the threshold value for the warning intervention or braking intervention is lowered for a travel-direction indication of the approaching second vehicle in the direction of the first trajectory.

4. The method of claim 1, wherein the threshold value for the warning intervention or braking intervention is increased for a travel-direction indication of the approaching second vehicle in a direction other than toward the first trajectory.

5. The method of claim 1, wherein traffic-lane information, provided based on map data, navigation devices, satellites, or by cloud support, is included in determining the second trajectory.

6. The method of claim 5, wherein the traffic-lane information includes usage restrictions for traffic lanes that may be affected by possible trajectories of the approaching second vehicle.

7. The method of claim 1, wherein the first vehicle is configured to enter into an automated communication link with the approaching second vehicle, and wherein the information thereby obtained is included in determining the second trajectory.

8. The method of claim 1, wherein the first trajectory is calculated for a parking-space exit operation by the first vehicle.

9. A system, comprising a control device for a driving assistance system of a first vehicle, the control device being programmed to:
   calculate a first trajectory of a planned rearward movement of the first vehicle;

obtain data about a second vehicle approaching from the rear or the side;

obtain data specifying a travel-direction indicator of the second vehicle;

estimate a second trajectory of the second vehicle based on detecting one of an absence or a presence of the travel-direction indicator of the second vehicle;

adapt threshold values for one or both of a warning intervention and a braking intervention based on detecting a presence of the travel-direction indicator of the second vehicle, wherein the threshold values are set in the driving assistance system to trigger the warning or the braking intervention based on a spatial interval or a time interval in relation to the second vehicle; and maintain the threshold values for one or both of the warning intervention and the braking intervention based on detecting an absence of the travel-direction indicator of the second vehicle.

10. The system of claim 9, wherein the driving assistance system comprises a cross-traffic alert.

11. The system of claim 9, wherein the control device is further programmed such that the threshold value for the warning intervention or the braking intervention is lowered for a travel-direction indication of the approaching second vehicle in the direction of the first trajectory.

12. The system of claim 9, wherein the control device is further programmed such that the warning intervention or the braking intervention is increased for a travel-direction indication of the approaching second vehicle in a direction other than toward the first trajectory.

13. The system of claim 9, wherein the control device is further programmed such that traffic-lane information, provided based on map data, navigation devices, satellites, or by cloud support, is included in determining the second trajectory.

14. The system of claim 13, wherein the control device is further programmed such that the traffic-lane information includes usage restrictions for traffic lanes that may be affected by possible trajectories of the approaching second vehicle.

15. The system of claim 9, wherein the first vehicle is configured to enter into an automated communication link with the approaching second vehicle, and wherein the information thereby obtained is included in the determining of the second trajectory.

16. The system of claim 9, wherein the control device is further programmed to calculate the first trajectory for a parking-space exit operation by the first vehicle.

17. The system of claim 9, further comprising the first vehicle.

18. The system of claim 9, wherein the control device is further programmed to lower the threshold values for one or both of the warning intervention and the braking intervention based on determining that the second trajectory intersects the first trajectory.

19. The system of claim 9, wherein the control device is further programmed to increase the threshold values for one or both of the warning intervention and the braking intervention based on determining that the second trajectory fails to intersect the first trajectory.

20. A system, comprising a control device for a driving assistance system of a first vehicle, the control device being programmed to:

calculate a first trajectory of a planned rearward movement of the first vehicle;

obtain data about a second vehicle approaching from the rear or the side;

obtain data specifying a travel-direction indicator of the second vehicle;

estimate a second trajectory of the second vehicle based on detecting one of an absence or a presence of the travel-direction indicator of the second vehicle;

adapt threshold values for one or both of a warning intervention and a braking intervention based on detecting a presence of the travel-direction indicator of the second vehicle, wherein the threshold values are set in the driving assistance system to trigger the warning or the braking intervention based on a spatial interval or a time interval in relation to the second vehicle;

maintain the threshold values for one or both of the warning intervention and the braking intervention based on detecting an absence of the travel-direction indicator of the second vehicle; and increase the threshold values for one or both of the warning intervention and the braking intervention based on determining that the second trajectory fails to intersect the first trajectory.

* * * * *